United States Patent [19]

Rohrbacher et al.

[11] Patent Number: 5,001,000

[45] Date of Patent: Mar. 19, 1991

[54] PROCESS FOR FORMING A COMPOSITE STRUCTURE OF THERMOPLASTIC POLYMER AND SHEET MOLDING COMPOUND

[75] Inventors: Frank Rohrbacher, Wilmington, Del.; Patrick L. Spain, Lowell, Ind.; Roger A. Fahlsing, Park Forest, Ill.

[73] Assignee: E. I. Du Pont de Nemours and Company, Wilmington, Del.

[21] Appl. No.: 493,837

[22] Filed: Feb. 13, 1990

Related U.S. Application Data

[62] Division of Ser. No. 249,152, Sep. 26, 1988, Pat. No. 4,959,189.

[51] Int. Cl.$^5$ .................. B32B 7/02; B32B 27/08; B32B 27/36
[52] U.S. Cl. .................. 428/215; 428/421; 428/463; 428/480; 428/482; 428/483; 428/911
[58] Field of Search .............. 428/480, 220, 463, 336, 428/334, 482, 911, 483, 215, 421; 156/182, 219, 230, 238, 239; 264/510, 512, 320, 250, 101; 425/112, 150, 405.1; 525/168

[56] References Cited

U.S. PATENT DOCUMENTS

| | | | |
|---|---|---|---|
| 3,419,458 | 12/1968 | Brooks et al. | 428/163 |
| 3,679,510 | 7/1972 | Conley et al. | 156/182 |
| 3,974,124 | 8/1976 | Pelham, Sr. | 428/911 |
| 4,075,266 | 2/1978 | Theysohn | 264/250 |
| 4,161,471 | 7/1979 | Kassal | 525/168 X |
| 4,239,808 | 12/1980 | Arneson | 428/482 |
| 4,444,829 | 4/1984 | Bollen et al. | 428/220 |
| 4,470,787 | 9/1984 | Gram | 425/150 |
| 4,482,604 | 11/1984 | Danemeyer et al. | 428/336 |
| 4,488,862 | 12/1984 | Epel et al. | 425/405.1 |
| 4,515,543 | 5/1985 | Hammer | 425/112 |
| 4,551,085 | 11/1985 | Epel et al. | 425/405.1 |
| 4,557,889 | 12/1985 | Masuda et al. | 264/320 |
| 4,612,149 | 9/1986 | Iseler et al. | 264/101 |
| 4,643,789 | 2/1987 | Parker et al. | 156/219 |
| 4,650,533 | 3/1987 | Parker et al. | 156/219 |

FOREIGN PATENT DOCUMENTS

| | | | |
|---|---|---|---|
| 0237871 | 9/1987 | European Pat. Off. | 264/510 |
| 1404394 | 8/1970 | Fed. Rep. of Germany | 264/512 |

OTHER PUBLICATIONS

English Translation of German Publication Application No. 1404394, Moeller.

*Primary Examiner*—Thomas J. Herbert
*Attorney, Agent, or Firm*—Hilmar L. Fricke

[57] ABSTRACT

A process for making a rigid composite structure with a thermoplastic polymer surface by:

a. thermoforming a thermoplastic polymeric sheet into a three dimensional structure; the sheet has primary glass transition temperature that is at least 10° C. greater than the molding temperature of step c. below;

b. placing the thermoformed structure and a charge of sheet molding compound (SMC) in a mold and c. heating the charge and thermoformed structure under pressure in the mold to cure the SMC and to adhere the SMC to the thermoformed structure, where the molding temperature is at least 10° C. below the primary glass transition temperature of the thermoplastic polymeric sheet;

the resulting composite structure which can be finished with a paint or a layer of clear coat and color coat also is part of the invention.

21 Claims, 3 Drawing Sheets

PROCESS FOR FORMING A COMPOSITE STRUCTURE OF THERMOPLASTIC POLYMER AND SHEET MOLDING COMPOUND

This is a division of application Ser. No. 07/249,152, filed Sept. 26, 1988, now U.S. Pat. No. 4,959,189.

BACKGROUND OF THE INVENTION

This invention is related to a process for forming a composite structure of sheet molding compound (SMC) and to the resulting composite structure.

SMC, which is a composition of reinforced thermosetting polymeric material such as cured polyester resin reinforced with fiber glass, is widely used for many parts used in trucks, buses, automobiles, appliances, business equipment, recreational vehicles and recreational equipment such as, water skis and the like. In the field of construction, SMC has been molded into such items as bathtubs, shower stalls, vanities and residential doors. In automobiles, SMC parts are used to replace sheet metal parts such as fenders, doors, hoods, and roofs. In some cases, the entire exterior of the auto has been made from SMC. Some of the advantages of SMC over metal parts are that SMC is free from corrosion and rapid deterioration from weathering which has always been a serious problem with metals; SMC parts are more resistant to denting than metals and SMC can be economically molded into intricate parts which can not be done with metals.

After molding SMC into a part, the surface of the SMC is porous, rough and often has other imperfections and in general is not a smooth shining class A surface that can be finished readily or painted. To obtain a smooth paintable surface of high quality, the surface of the part is usually cleaned and primed with an appropriate primer and then painted or a topcoating material applied such as a polyester gel coat. An in-mold coating process can also be used as shown in Masuda et al U.S. Pat. No. 4,557,889 issued Dec. 10, 1985 in which a coating is sprayed into a mold before the SMC part is formed. In the molding process, the coating is adhered to the surface of the part. Paint injection molding also can be used in which paint is injected under pressure into the mold containing SMC to decorate the SMC part that is formed. To reduce cost and improve efficiency, it would be desirable to eliminate any extra steps as shown above in the above conventional processes used for finishing SMC parts.

Conley et al U.S. Pat. No. 3,679,510 issued July 25, 1972, shows the lamination of a relatively thick thermoplastic sheet with a polyvinyl fluoride outer surface to a glass fiber reinforced polyester resin sheet (SMC) to form a laminate. Such laminates having a major portion of a thermoplastic sheet have a low modulus and are not useful for many automotive and truck parts that require high modulus materials for rigidity and thermal stability such as auto and truck hoods. When an attempt was made to reduce the thickness of the thermoplastic layer with the materials taught by Conley et al, the imperfections from the fiberglass in the SMC layer show through and one cannot form a part that is acceptable for automotive or truck use.

It would be desirable to form SMC parts that are relatively rigid, have a smooth surface that is free from surface imperfections of the SMC substrate and requires essentially no surface preparation prior to painting. Also, it would be desirable to form parts that have a high quality durable and weatherable finish that have the desired color that matches other painted parts of an auto or truck and that can be used in assembly without additional preparation. The novel process of this invention provides the above; it forms SMC parts that are relatively rigid and have a class A surface that can be readily painted or forms a relatively rigid SMC part that has a high quality colored surface or prefinished surface finished with a layer or layers of paint that matches adjacent painted colored surfaces of metallic or plastic parts and can be used directly for auto or truck assembly.

SUMMARY OF THE INVENTION

A process for making a rigid composite structure with a thermoplastic polymer surface using the following steps:

a. a thermoplastic polymeric sheet is thermoformed into a three dimensional structure; the thermoplastic polymeric sheet has a primary glass transition temperature that is at least 10° C. greater than the molding temperature of step e. below;

b. a mold having an upper die and lower die with opposing molding surfaces cooperating to define a mold cavity with one of the dies having a shape corresponding to the three dimensional thermoformed structure is opened;

c. the thermoformed structure prepared in step a. above and a charge of sheet molding compound (SMC) are placed on the molding surface of one of the dies;

d. the mold is closed so that the dies compress the charge causing it to fill the mold cavity;

e. the charge and thermoformed structure are molded by heat and pressure to cure the SMC and to adhere the SMC to the thermoformed structure, a molding temperature of at least 10° C. below the primary glass transition temperature of the thermoplastic polymeric sheet is used, preferably a temperature of about 135–160° C. and a pressure of about 3–15 MPa are used; and f. the dies are opened and the resulting rigid composite structure having a thermoplastic polymer surface composed of the thermoformed structure firmly adhered to the SMC is removed.

Another part of this invention is the rigid composite structure that has a flexible thermoformed sheet of a thermoplastic polymeric material having a glass transition temperature of at least 145° C. that is bonded to a thick rigid layer of SMC composed of a thermosetting polymeric resin reinforced with materials such as filler pigments, fiberglass and the like as is the finished composite structure having an outer layer of a glossy clear thermoplastic finish that is firmly bonded to a layer of a thermoplastic pigment containing paint that is firmly bonded to a thin size layer of a thermoplastic polymer that is firmly bonded to the flexible thermoformable sheet of the composite structure. Another aspect of this invention is a flexible laminate of a glossy clear layer, a pigment containing paint layer and a thin size layer bonded to the flexible thermoformable sheets.

DETAILED DESCRIPTION OF THE INVENTION

Figure 1:
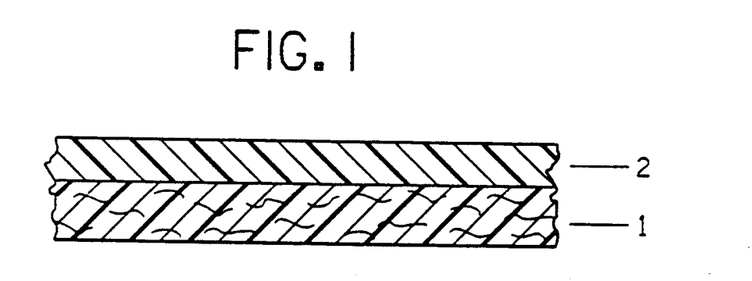
FIG. 1 shows a cross section of the composite structure of a thermoformed thermoplastic sheet 2 bonded to a thick rigid layer of SMC 1.

FIG. 1 shows a cross section of the composite structure of a thermoformed thermoplastic sheet 2 bonded to a thick rigid layer 1 of SMC of a thermosetting polymeric resin reinforced with filler pigment and glass fibers. Preferably, the thermoformable thermoplastic sheet is about 125-1000 microns thick and the SMC layer is about 1500-7500 microns thick. A second layer of the thermoplastic sheet 2 can be bonded to the bottom side of the SMC layer to form a reinforced structure.

Figure 2:
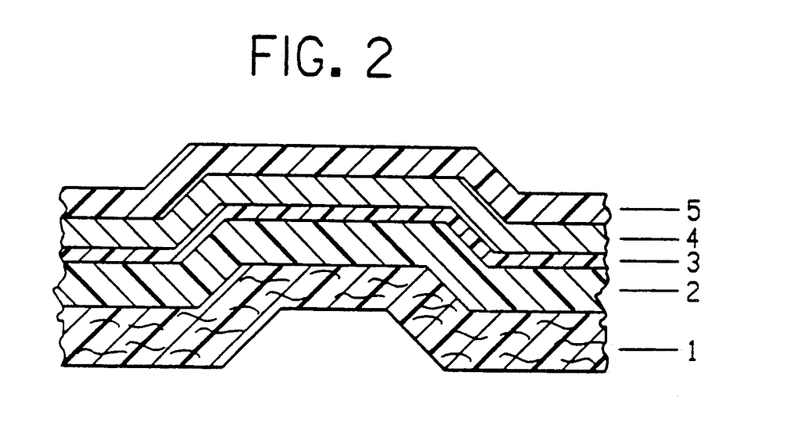
FIG. 2 shows a cross section of the composite structure having a clear layer 5, a pigmented layer 4, a size layer or layers 3, a thermoformed thermoplastic polymeric sheet 2, and a thick rigid layer 1 of SMC.

FIG. 2 shows a cross section of the composite structure having a clear coat/color coat or pigmented paint layer. Layer 5 which is the exterior layer of the composite is a thermoplastic clear coating that has an glossy finish. If the composite is to be used for autos and trucks, the coating must have excellent weatherability, scratch and mar resistance and good gloss retention on weathering. Layer 5 is firmly adhered to paint layer 4 which is a pigmented paint and if used for autos and trucks, it also must be of automotive quality that withstands weathering and does not crack and fade. The combination of layers 4 and 5 provide the composite structure with a high quality finish that has the aforementioned properties required for automotive uses.

Layer 3 of FIG. 2 is a thin layer of a thermoplastic size that provides intercoat adhesion of the pigmented paint layer 4 to layer 2 which is a thermoplastic polymeric sheet. Layer 1 is a relatively thick rigid layer of SMC of a polyester resin polymerized with monomers such as styrene and contains filler pigments and is reinforced with fiber glass. Preferably, a weight ratio of about 1:1:1 of polyester resin to filler pigments to fiber glass is used.

Preferably, the composite structure has the following thickness for each layer:

1. a 15-125 micron thick layer of the glossy clear thermoplastic finish that is bonded firmly to
2. a 10-75 micron thick layer of the thermoplastic pigment containing paint that is firmly bonded to
3. a 1-20 micron thick layer or layers of a thermoplastic size that is firmly bonded to
4. a 125-1000 micron thick layer of a flexible sheet of a thermoplastic polymeric material that is bonded to
5. a 1500-7500 micron thick rigid layer of SMC.

Figure 3:
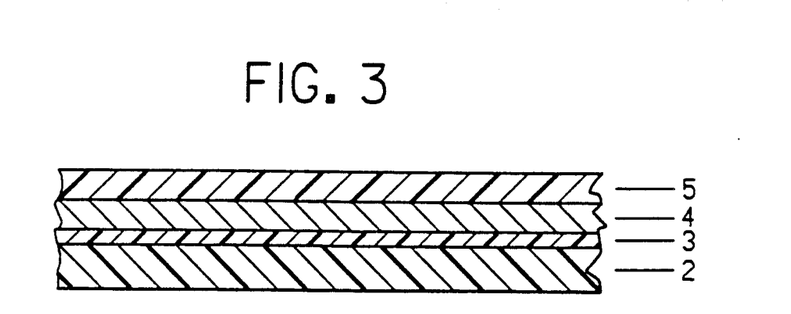
FIG. 3 shows a cross section of the thermoformable laminate or face sheet of a clear layer 5, a pigmented layer 4, a size layer or layers 3, a thermoformable thermoplastic polymeric sheet 2.

In the formation of the composite structure, a thermoformable laminate or face sheet is first formed. FIG. 3 shows a cross section of the face sheet. The face sheet is composed of layers 2-5 of the above composite structure and each of these layers has the same thickness as set forth above for the composite structure.

Figure 4:
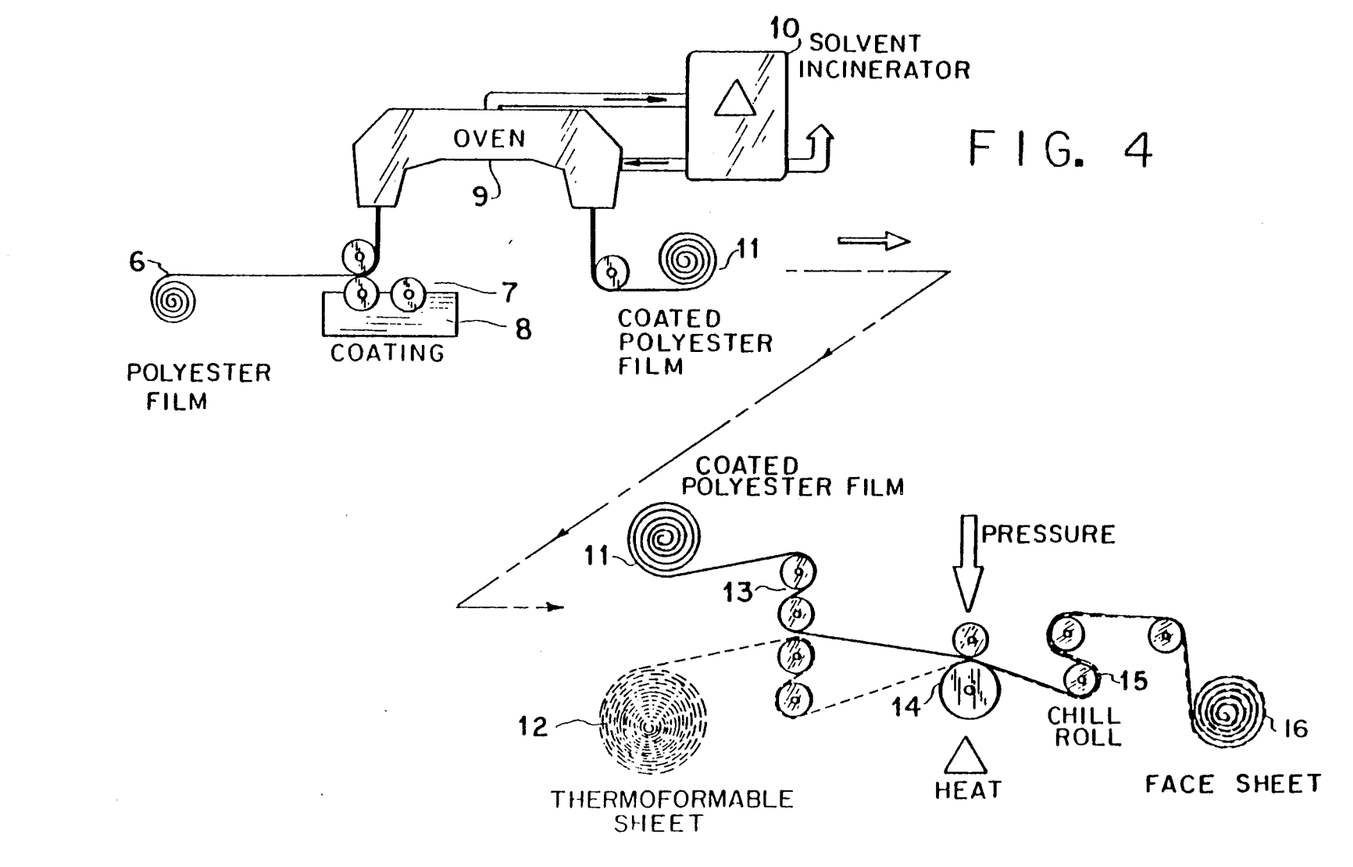
FIG. 4 shows roller coating of paint onto a polyester film and the formation of the thermoformable laminate or face sheet.

FIG. 4 shows a process for making the laminate or face sheet. A flexible polymeric carrier sheet 6, preferably a polyester film, typically a "Mylar" 200A polyethylene terephthalate film about 50 microns thick, is fed through a 3 roll roller coater 7 containing a clear coating composition 8 and by reverse roller coating, about a 15-125 micron thick clear coating (dry basis) is applied. Coating line speeds of about 5-25 meters/minute are used. The coated film is then passed through the oven 9, preferably having multiple heating zones. Typically, three heating zones are used in the oven. The first zone is at about 125° C. and the last zone is at about 200° C. A solvent incinerator 10 is used to incinerate solvent fumes from the coating composition. The coated film is then wound into roll 11. The roller coater 7 is filled with a pigmented coating composition instead of the clear composition and the process is repeated to apply about 10-75 micron thick coating (dry basis) of the pigmented coating or color coat over the clear coat layer on the film to form a polyester film having a clear coat layer and a color coat layer. The resulting coated polyester film 1 is then coated using the same process with a 1-25 micron thick layer (dry basis) of a size layer of a thermoplastic polymer such as a polyurethane.

The resulting coated polyester film is then laminated to a thermoplastic polymeric sheet about 125-1000 microns in thickness. The roll of coated polyester film 11 and a roll of the thermoplastic polymeric sheet are fed at a line speed of about 5-20 meters/minute through guide rollers 13 and then through two heated nip rollers 14 that are at a temperature of about 200° C. and a pressure of about 65 to 350 kg/linear cm is used to form a laminate. The resulting laminate is passed around chill roll 15 and the laminate or face sheet 16 which is thermoformable and is wound into a roll.

Figure 5:
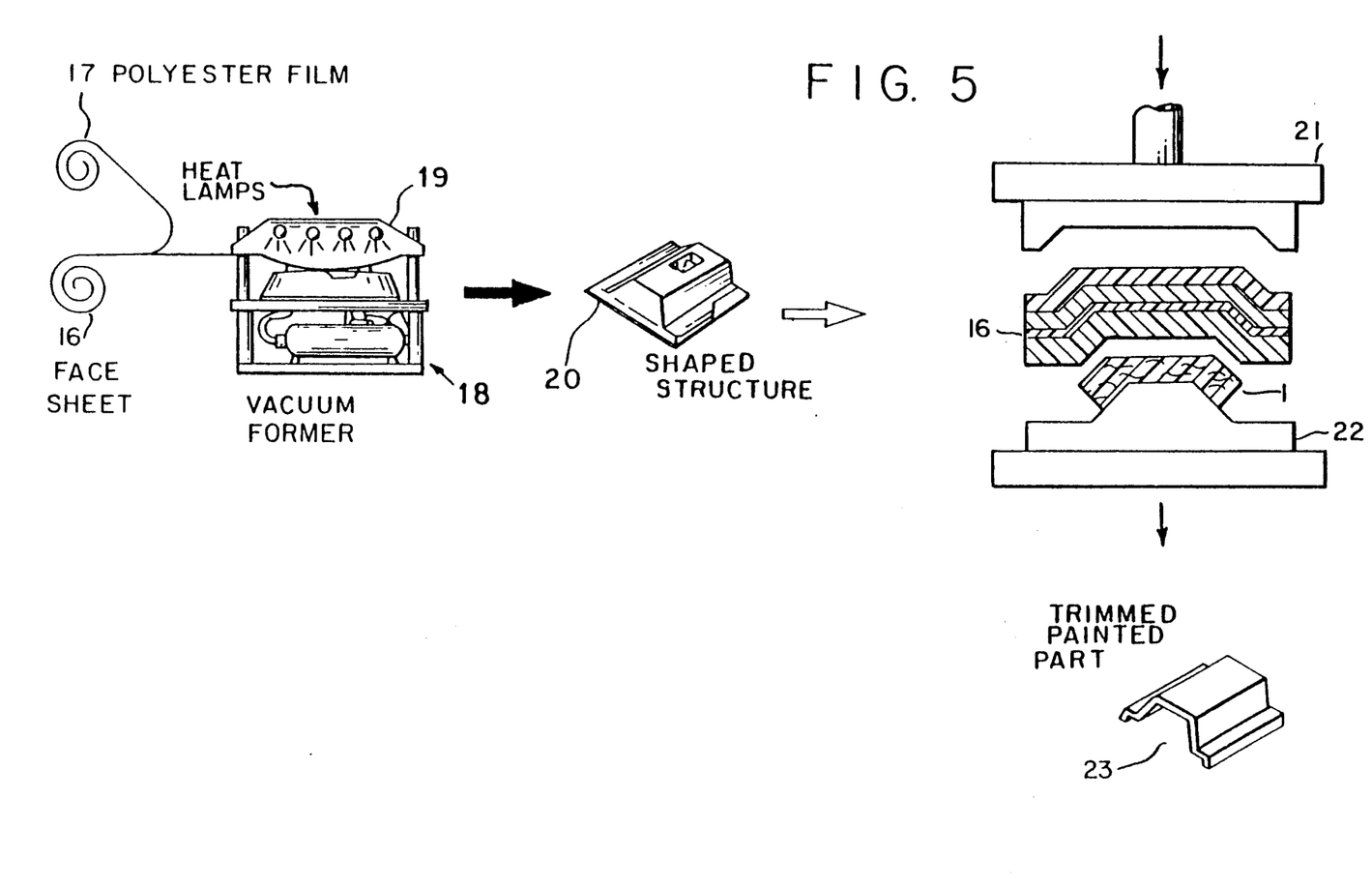
FIG. 5 shows the process for making the composite structure from the face sheet.

FIG. 5 shows the removal of the polyester film from the face sheet 16 which is wound onto a roll 17. A section of the resulting face sheet is then thermoformed into a shaped structure by placing it in a vacuum former 18 containing heating lamps 19 and the face sheet is heated to about 190-235° C. The sheet is then thermoformed by pulling a vacuum and using a pressure assist of up to 3 atmospheres. Usually, about 1-3 atmospheres of pressure are used. The resulting thermoformed structure 20 having a painted surface can be used in a molding process with SMC to form a part such as an auto or truck part. The shaped structure 20 is positioned in a conventional compression molding machine 21. A thick layer of green or uncured SMC 1 is positioned on the bottom die of the mold. Preferably, the SMC charge covers about 40-80% of the molding surface of the die. The mold is closed and the composite is heated preferably to about 140-160° C. and molded under a pressure of about 3-15 MPa. The SMC which has been cured in the process forms the backing layer of the resulting composite and is about 1500-7500 microns in thickness. The resulting composite or part 23 is useful for autos and trucks and has a surface that is smooth and glossy, has an excellent distinctness of image and good color uniformity and in general meets all the requirements of an automotive finish.

The glossy clear finish and the paint layer provide the composite structure with an exterior decorative finish. To be acceptable for automotive and truck use, the finish must have the following properties a gloss measured at 20° of at least 80 and measured at 60° of at least 90, a distinctness of image (DOI) of at least 80, must have gasoline, abrasion, mar and acid resistance, and excellent weatherability including good gloss retention.

The following is a description of the test methods used to determine the above properties. Certain test methods identified below are publicly available standard industry specifications and test methods which are incorporated herein by this reference.

Gloss is measured by specular reflectance of a beam of light at angles of 20° and 60°. Specular reflectance is measured before the finished painted surface is buffed and waxed. A Byk-Mallinckrodt "multigloss" or "single gloss" gloss meters are used for measuring specular gloss of the finish. These gloss meters give values equivalent to those obtained from ASTM Method D-523-67. The preferred test method is described in GM Test Specification TM-204-A.

Distinctness-of-Image (DOI) is a measurement of the clarity of an image reflected by the finish. DOI is measured from the angle of reflection of a light beam from a spherical surface. DOI is measured by the Hunterlab Model No. D47R-6F Doigon Gloss Meter. A test panel is placed on the instrument sensor and the sharpness of the reflected image is measured. Details of the DOI test procedure are described in GM Test Specification TM-204-M.

Gasoline Resistance requires that there is no color change, degradation, tackiness, marring or loss of paint adhesion on plastic parts after a finished part is immersed for ten seconds, ten times, in a specified reference fuel with a 20 second dry off period between each immersion. Immediately after the tenth immersion, the painted surface is checked and must pass Thumbnail Hardness according to GM Test Specification TM 55-6.

Cleanability is tested according to GM Test Specification TM 31-11 in which the painted plastic part is subjected to ten rubs with cheesecloth saturated with 9981062 Naphtha or currently used and approved cleaning solvents. There should be no evidence of staining, discoloration, or softening of the painted surface and no evidence of color transfer from the painted surface to the cloth. One rub consists of one forward and backward motion.

The Acid Spotting Resistance Test requires the painted part to withstand exposure to 0.1 N sulfuric acid for 16 hours without any evidence of staining, discoloration, or softening of the paint.

Hardness is measured by a standard Knoop Hardness Test.

Chip resistance is determined by a Gravelometer Test described in SAE J-400. The painted part as received and after 3 and 6 months Florida exposure, described below, is tested at −23° C. and must have a minimum rating of 8 as determined by F. B. Gravelometer Rating Chart.

Impact strength of a painted part is tested at room temperature by the Gardener Test and by the Rosand Test at −29° C.

Paint Adhesion of a painted part is determined by a standard Tape Adhesion Test described in GM Test Specification TM 55-3. According to this test, a tape is pressed down over an X-shaped cut in the paint coat and the tape is then removed to test the amount of peeling. The test requires a minimum of 99% of the pain remaining in the tape test area. of the paint remaining Resistance to Water and Humidity Exposure is measured by several tests. In one test, the finished part is exposed to 96 hours of humidity exposure at 100% relative humidity and 38° C. in a humidity cabinet defined in GM test specification TM 55-3, and a two-hour water immersion test at 38° C. according to GM test specification TM 55-12. The resulting paint panel should show no evidence of blistering when examined one minute after removal from the test cabinet and shall withstand the Paint Adhesion Test described above. The Paint Adhesion Test is performed within one minute after removal from either test cabinet. In a second test, the painted panel should withstand 15 cycles of the Moisture-Cold Cycle Test defined in GM test specification TM 45-61A, without any visible signs of cracking or blistering. After 15 cycles, the paint panel is exposed to 96 hours of the humidity exposure described above, followed by the Paint Adhesion Test also described above. The panel is expected to pass both tests. The Paint Adhesion Test is performed within one minute after removal from the humidity environment. One cycle consists of 24 hours and 100% relative humidity at 38° C., 20 hours at −23° C., and four hours at room temperature.

For outdoor weatherability, painted panels are exposed for up to 3 years in Florida facing south in a black box positioned 5° from the horizontal. The painted panels should retain 40% of their original gloss and there should be no blistering or fading of the paint.

The finish must be sufficiently flexible at thermoforming temperatures and must have sufficient durability to withstand thermoforming and compression molding process without embrittling, cracking or otherwise degrading the finish. The finish must retain its gloss and other appearance properties after processing.

In the event the composite is used for other purposes than exterior automotive and truck parts, the requirements of the finish are different and usually less than indicated above and the clear finish may be eliminated and only the pigmented or colored finish used. For example, bathtubs and shower stalls would not require a clear and pigmented finish with exterior durability and appearance as required for an automotive part and only a pigmented finish may be used.

Colored pigments or dyes can be incorporated into the thermoplastic polymeric sheet by using conventional techniques and a composite structure can be formed with a colored surface without the use of a finish. A composite structure with a colored thermoplastic polymeric sheet may be adequate for many uses such as interior parts for automobiles and trucks, the back of a composite structure with a painted or finished surface such as the inside of a hood that has a painted surface, or for shower stalls or bathtubs.

The glossy clear finish used for an exterior automotive or truck part is formed from a clear coating composition. The composition contains about 15–80% by weight film forming binder and correspondingly, about 85–20% by weight of a liquid carrier. The composition may have a solvent carrier or an aqueous carrier and the binder of the composition may be in solution or in dispersion form. The binder basically is thermoplastic and needs to withstand the thermoforming and molding process for making a part. Both the clear layer and the pigmented or colored layer of the composite structure must be able to withstand an elongation of about 40–150% at a film thickness of about 10–50 microns and thermoforming temperatures of about 190–235° C.

Thermoplastic fluorinated polymers such as polyvinyl fluoride (PVF), polyvinylidene fluoride (PVDF) and copolymers and terpolymers thereof also can be used for the clear coating composition. A blend of an acrylic resin and a fluorinated polymer also can be used.

The blend contains about 50–80% by weight of PVDF and correspondingly 20–50% by weight of a polyalkyl methacrylate. Generally, a high molecular weight (MW) PVDF resin is used having a weight average MW weight of about 200,000–600,000 and a relatively high MW polymethyl methacrylate or polyethyl methacrylate having a weight average MW of about 50,000–400,000.

To improve weatherability of the clear coat about 0.1–5%, by weight, based on the weight of the binder, of an ultraviolet light stabilizer or screeners or a combination of ultraviolet light stabilizers and screeners can be added to the clear coating composition. Typically useful ultra-violet light stabilizers and screeners are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2′,2′-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2′-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

The clear coat can also contain transparent pigments, i.e., pigments having the same or similar refractive index as the binder of the clear coat and are of a small particle size of about 0.015–50 microns. Typical pigments that can be used in the clear coat in a pigment to binder weight ratio of about 1/1000 to 10/1000 are inorganic siliceous pigments, such as silica pigments. These pigments have a refractive index of about 1.4–1.6.

The color coating composition used herein has as the binder any of the aforementioned binders used in the clear coating composition and also it may be advantageous to use ultraviolet stabilizers in the composition. The composition does contain pigments in a pigment to binder weight ratio of about 1/100 to 100/100.

Any of the conventional pigments used in coating compositions can be utilized such as the following: metallic oxides, such as titanium dioxide, zinc oxide, iron oxide and the like, metal hydroxide, metal flakes such as aluminum flake, pearlescent pigments, chromates, such as lead chromate, sulfides, sulfates, carbonates, carbon black, silica, talc, china clay, phthalocyanine blues and greens, organo reds, organo maroons and other organic pigments and dyes.

The pigments are formulated into a mill base by mixing the pigments with a dispersing resin which may be the same as the binder of the composition or may be another compatible dispersing resin or agent. The pigment dispersion is formed by conventional means such a sand grinding, ball billing, attritor grinding, two roll milling. The mill base is then blended with the binder of the composition to form the coating composition.

Often it is convenient or necessary to apply a thin size layer or several size layers to the pigmented layer to improve or enhance adhesion to the thermoplastic polymeric material. Typical polymeric materials useful for the size layer are polyalkyl acrylates, polyalkyl methacrylates, vinyl chloride polymers, polyurethanes, polyimides, and mixtures of the above.

The thermoplastic polymeric sheet used in the composite hides any imperfections in the surface of the SMC substrate. The thermoplastic polymeric sheet must be of a sufficient thickness, preferably 125–1000 microns thick, and have a glass transition temperature of at least 10° C. above the molding temperature of the sheet to the SMC to accomplish the above. By not excessively softening the thermoplastic polymeric sheet during molding, any surface defects of the SMC substrate usually caused by glass fibers in the SMC will not show through to the surface of the resulting composite structure formed by the process of this invention. This will allow higher levels of glass fiber and filler to be used in the SMC than is conventionally used.

Preferably, a thermoplastic polymeric material having a primary glass transition temperature of at least 145° C. is used. Preferably, a polyarylate is used. The polyarylate optionally can contain at least one olefin polymer. The polyarylate is the reaction product of at least one dihydric phenol and at least one dicarboxylic acid. Any of the well known dihydric alcohols and dicarboxylic acids can be used to form the polyarylate.

One prefered polyarylate is the polymerization product of 2,2-bis(4-hydroxyphenyl) propane and an aromatic dicarboxylic acid from the group of isophthalic acid, terephthalic acid or any mixtures thereof.

One useful olefin polymer that can be blended with the polyarylate has epoxide functionality and is the polymerization product of the following monomers:

(a) about 0.5–15% by weight, based on the weight of the olefin-polymer, of where R is H or alkyl group having 1–6 carbon atoms, (b) about 45–99% by weight, weight of the olefin polymer, of $CH_2=CHR$ where R is H or lower alkyl group, and (c) about 0.1–40% by weight, based on the weight of the olefin polymer, of $CH_2=C(R^1)COOR^2$ where $R^1$ is H or lower alkyl and $R^2$ is an alkyl group having 1–8 carbon atoms.

One particularly useful olefin polymer for the polyarylate is the polymerization product of glycidyl methacrylate, ethylene and butyl acrylate.

The polyarylate can contain up to 15% by weight of a copolymer of at least one of styrene and alpha methyl styrene and at least one of acrylonitrile and methacrylonitrile. Preferably, a copolymer of styrene and acrylonitrile is used.

One preferred thermoplastic polymer sheet used to form the composite contains about (a) 85 to 98% by weight of a polyarylate of the polymerization product of 2,2-bis(4-hydroxyphenol) propane terephthalic acid and isophthalic acid, (b) 2–15% by weight of an olefin polymer containing epoxide functionality of the polymerization product of about (1) 0.5–15% by weight, based on the weight of the olefin polymer of glycidyl methacrylate, (2) 45–99% by weight, based on the weight of the olefin polymer of ethylene, and (3) 0.1–40% by weight, based on the weight of the olefin polymer, of butyl acrylate.

Another preferred thermoplastic polymeric sheet contains about (a) 84 to 98.7% by weight of a polyarylate of the polymerization product of terephthalic acid and isophthalic acid, (b) 1-22% by weight of an olefin polymer containing epoxide functionality of the polymerization product of about (1) 0.5-15% by weight, based on the weight of the olefin polymer of glycidyl methacrylate, (2) 45-99% by weight, based on the weight of the olefin polymer of ethylene, and (3) 0.1-40% by weight, based on the weight of the olefin polymer, of butyl acrylate and (c) 0.3-15% by weight of a copolymer of styrene and acrylonitrile.

Other thermoplastic polymeric materials can be used such as a polyether sulfanone or polyamides modified with a polyarylate or with poly(2,6 dimethyl phenylene oxide). Typically useful polyamide are Nylon 66 which is polyhexamethylene adipamide and Nylon 612. However, modified polyamides and polyether sulfanones require a size layer be placed between the polyamide or polyether sulfanone and the SMC substrate to achieve the adhesion level desired. A polyurethane, acrylonitrile/butadiene/styrene terpolymer (ABS), styrene/acrylonitrile copolymer (SAN) or polystyrene can be used as the size layer.

The SMC layer of the composite typically is a polyester resin polymerized with monomers, filler pigment and glass fibers. Generally, the SMC contains about 30% by weight of glass fibers but SMC sheets containing 35% and above of glass fiber also can be used. The polyester resin is an acid terminated polyester of an alkylene glycol and an aliphatic and an aromatic dianhydride or acid and the polymerized monomers of styrene or alph-methyl styrene. In one preferred SMC, the polyester resin is the esterification product propylene glycol isophthalic acid and maleic anhydride and the monomer is styrene and the polyester is reacted with magnesium oxide, magnesium hydroxide or magnesium carbonate and the filler pigment is calcium carbonate. Also, the SMC can contain up to 15% by weight of a low profile additive of a high molecular weight thermoplastic resin.

Instead of the SMC, a thermally curable polymeric material reinforced with a material such as fiberglass and that can be processed by injection molding can be used. Common materials of this type are known a PIM, pressure injection molded material or RRIM, reinforced reaction injection molding material. Typically useful materials of this type are polyurethanes, polyureas, polyamides, polyesters or blands, thereof containing fiberglass and filler pigments. In utilizing such materials to form a part, the thermoformed face sheet described herein is placed in an injection molding machine and the thermally curable material is injected in back of the face sheet and cured and a part is formed.

The composite structure of this invention provides many advantages over prior art SMC structures. The composite structure has a class A surface and can be readily finished with paint or with a gel coat without surface preparation such as cleaning and priming thereby saving costs in the finishing process. To reduce cycle time, the composite can be removed from the mold before it is fully cured and then afterward fully cured by thermal or radiation curing. An additional finish, for example to improve mar resistance, may be applied after the part is removed or in the coating of the face sheet which is crosslinked by this further curing.

The composite structure can be prepared with a colored thermoplastic layer or can be formed with a colored paint layer or with a clear coat and pigmented paint layer and can be used for auto and truck parts without additional painting. Outside of the automotive field, parts formed from the composite structure can be used for recreational equipment such as snow mobiles, skis and the like, for appliances, business equipment, for building construction for items such as bathtubs, shower stalls, vanities, doors and the like.

The following Examples illustrate the invention. All parts and percentages are on a weight basis unless otherwise indicated and molecular weights are determined by gel permeation chromatography using polymethyl methacrylate as a standard.

The following abbreviations are used in the examples:
PVDF—polyvinylidene fluoride
PVF—polyvinyl fluoride
SMC—sheet molding compound
UV—ultraviolet light
BLO—butyrolactone
DIBK—diisobutyl ketone
ABS—acrylonitrile/butadiene/styrene terpolymer

EXAMPLE 1

A high gloss red laminated exterior automotive paint coat was formed on the top surface of a 15.25 cm×25.4 cm SMC test plaque. The paint coat was first coated onto a casting film comprising a 50 micron thick high gloss "Mylar" A200 polyester film. A clear coat, color coat, and size coat were coated onto the casting film in that order.

The clear coat was prepared from the following formulation:

| Ingredient | Parts |
| --- | --- |
| Cyclohexanone | 15.47 |
| BLO | 7.52 |
| DIBK | 21.66 |
| Polyethyl methacrylate ("Elvacite" 2042) | 12.95 |
| UV absorbers | 1.10 |
| PVDF ("Kynar" 301F) | 24.05 |
| BLO | 17.25 |
| Total | 100.00 |

The "Elvacite" acrylic resin was dissolved in the BLO, DIBK and cyclohexanone solvents, while resulting and under heat at approximately 54° C. The resulting mixture was allowed to cool overnight. The UV absorbers were then added to the mixture and the PVDF was dispersed in the resin. The remaining BLO solvent was added to dilute the final mixture. The PVDF component was dispersed in the mixture and not dissolved. The dried clear coat contained approximately 65% PVDF and 35% acrylic resin, based on the total PVDF and acrylic solids.

The clear coat was coated on the casting film in a dry film thickness of 15 microns. The clear coat was applied by a reverse roll coater. The clear coat was dried on the carrier sheet by passing it through a multi-zone impinging air drying oven having three heating zones spaced apart axially along the length of the carrier, with each drying zone having a progressively higher temperature. The clear-coated carrier was passed through the heating zones at a line speed of 7.62 meters per minute and each heating zone was 12.2 meters long. Temperatures of the three heating zones were: Zone 1: 127° C., Zone 2: 165° C., Zone 3: 200° C. Passing the clear coat through the three heating zones removed substantially all solvent gases from the clear coat to produce a dry clear coat of uniform film thickness.

A red color coat was next coated on the dried clear coat at a film thickness of about 20 microns. The red color coat was formulated as follows:

| Ingredient | Parts |
| --- | --- |
| Cyclohexanone | 10.61 |
| Polyethyl methacrylate ("Elvacite" 2042) | 2.99 |
| Dispersing agent (Solsperse 17,000) | 0.10 |
| PVDF ("Kynar" 301F) | 19.95 |
| BLO | 4.02 |
| Solvent (N-methyl pyrrolidone) | 8.45 |
| Red Dispersion | 57.90 |
| Total | 104.02 |

The red dispersion comprised several pigments including red pigment dispersed in a vehicle of polyethyl methacrylate resin, "Elvacite" 2043, 16% solids, and 84% cyclohexanone solvent. The red color coat was prepared in a similar manner to the clear coat in that the acrylic resin was first dissolved in the solvents at a temperature of about 55° C. The dispersing agent and a portion of the red dispersion were added. The mixture was allowed to cool to room temperature and the PVDF component was dispersed using a high speed mixer. The remainder of the red dispersion was then added to the resulting mixture to produce a red color coat.

The binder of the color coat has approximately 65% PVDF and approximately 35% acrylic resin, by weight of the total PVDF and acrylic (non-pigment) solids. The acrylic resin component contains polyethyl methacrylate, approximately 80% "Elvacite" 2043 and approximately 20% "Elvacite" 2042. The pigment was present in a ratio of three parts pigment to ten parts resin binder, or approximately 23% of the total solids. The color coat was coated onto the dried clear coat and then passed through the three-stage oven described above and dried.

A size coat was next prepared for use with a polyarylate thermoplastic polymeric sheet. The size coat formulation was as follows:

| Ingredient | Parts |
| --- | --- |
| Water based Polyurethane resin ("Neo Rez" R-9314 made by Polyvinyl Chemical Company) | 53.07 |
| Water based Polyurethane resin ("Neo Cryl" A-5144 made by Polyvinyl Chemical Company) | 35.31 |
| "Surfynol" 104H surfactant made by Air Products Company) | 0.27 |
| Bubble Breaker 3056A made by Witco Chemical Company) | 0.05 |
| "Triton" X-100 (nonionic surfactant made by Rohm and Hass) | 0.30 |
| Isopropyl alcohol | 0.97 |
| "Acrysol" TT-678 Thickener made by Rohm and Hass | 0.24 |
| Deionized water | 8.91 |
| "Lo Vel" 27 silica flattening agent | 0.88 |
| Total | 100.00 |

The size coat was then coated onto the dried color coat in a film thickness of about 4 microns. The size coat was applied by a reverse roll coater and then dried in the same three-stage drying oven as the clear coat and the color coat. The resulting paint-coated casting film was transferred to a laminating operation as shown in FIG. 4, described above, where the paint coat was transferred from the casting film to a 500 micron thick polyarylate facesheet made from Du Pont Bexloy ® M401 polyarylate resin. A temperature of 200° C. and a pressure of about 100 kg/linear cm was used to form the laminate. The polyarylate resin has a glass transition temperature of about 175–185° C. and is the polymerization product of 2,2-bis-(4-hydroxyphenyl)propane and a 97/3 mixture of isophthalic acid and terephthalic acid and contains 7.5% by weight of a terepolymer of ethylene/butyl acrylate/glycidyl methacrylate. The casting film was stripped away from the surface of the resulting laminate, leaving a red paint coat with a high gloss surface on the exterior of the polyarylate facesheet.

The laminate was then thermoformed by heating the laminate to a temperature of about 210° C. After the sheet was heated to this temperature, it was moved over a vacuum-former and a vacuum was drawn and a pressure of about 1 atmosphere was used to form the laminate, into a thermoformed structure of a 6"×10" test plaque.

The plaque was trimmed and then was inserted into a 15.25 cm×25.4 cm mold that was heated to 145° C. and placed in a 100 ton SMC press. The red color coat/clear coat finish of the plaque was placed against a high quality polished class A surface mold face. 300 grams of green SMC (Budd Co. DSM 950) was added to the mold and the mold was closed for 3 minutes. A temperature of 155° C. and a pressure of 10 MPa was used.

The DSM 950 SMC sheet has a specific gravity of 1.92, a flexural strength of about 160–185 MPa, a compressive strength of about 130–160 MPa, a tensile strength of about 65–80 MPa and is believed to be a polyester of propylene glycol and maleic anhydride and isophthalic acid, containing calcium carbonate filler pigment and fiberglass.

The resulting decorated cured SMC test plaque had a total thickness of 0.33 cm. The 20° gloss was 78 and the DOI was 83. The adhesion of the finish to the Bexloy ® M401 facesheet was excellent and the adhesion of the Bexloy ® M401 facesheet to the SMC was excellent. The plaque was tested against the automotive specification and in general met these specifications and showed the above process can produce automotive grade finished SMC parts.

EXAMPLE 2

A low gloss black laminated paint coat was formed on the top surface of a 25.4 cm×45.7 cm SMC plaque. A clear coat consisting of particulate polyvinyl fluoride dispersed in propylene carbonate solvent at 35% weight solids was substituted for the PVDF/acrylic clear system in Example 1 and was applied to a casting film described in Example 1 to dry film thickness of 50 microns and cured using the same procedure as in Example 1.

A black color coat was next coated on the dried clear coat at a film thickness of about 50 microns. The color coat formulation was as follows:

| Ingredient | Parts |
| --- | --- |
| PVF dispersion (35% PVF in propylene carbonate solvent) | 50.0 |
| Black pigment dispersion | 50.0 |

| Ingredient | Parts |
|---|---|
| Total | 100.0 |

The black color coat has a pigment to binder weight ratio (P/B) of 11.6/100 and a binder composition of PVF/MMA-MESO/acylic copolymer dispersant of 82/5/13. The black color coat was applied to the clear coat on the casting film prepared above and dried using the process of Example 1. The resulting color coat was treated with a conventional corona electrical discharge treatment and then a size layer of 4 microns of the size coat of Example 1 was applied using the same procedure as in Example 1. The resulting paint-coated casting film was transferred to a laminating operation shown in FIG. 4 described above, where the paint coat was transferred from the casting film a 425 micron thick polyarylate facesheet made from Du Pont Bexloy® M492 polyarylate 150° C. A temperature of about 200° C. and a pressure of about 100 kg/linear cm ere used for the nip rollers to form the laminate. The polyacrylate resin is the polymerization product of 2,2-bis-(4-hydroxyphenyl)propane and a 97/3 mixture of isophthalic acid and terephthalic acid and contains a terepolymer of ethylene/butyl acrylate/glycidyl methacrylate. The casting film was stripped away from the surface of the resulting laminate, leaving a black paint coat with a low gloss surface on the exterior of the polyacrylate facesheet.

The laminate was then thermoformed by heating the laminate to a temperature of about 200° C. After the sheet was heated to this temperature, it was moved over a vacuum-former and a vacuum was drawn and a pressure of about 1 atmosphere was used to form the laminate into thermoformed of a 25.4 cm×45.7 cm test plaque.

The plaque was trimmed and then was inserted into a 25.4 cm×45.7 cm mold that was heated to 138° C. and placed in a 100 ton SMC press. The black color coat/clear coat finish of the plaque was placed against a smooth dull surface mold face. 600 grams of green SMC (Budd Co. DSM 930) was added to the mold and the mold was closed for 3 minutes. A temperature of 138° C. and a pressure of 8 MPa was used.

The DSM 930 SMC sheet has a specific gravity of 1.90, a flexural strength of about 160–185 Mpa, a compressive strength of about 140–165 MPa, a tensile strength of about 65–80 MPa and is believed to be a polyester of propylene glycol and maleic anhydride and isophthalic acid, containing calcium carbonate filler pigment and fiberglass.

The resulting decorated cured SMC test plaque had a total thickness of 0.25 cm. and a low gloss suitable for automotive trim and under hood parts. The adhesion of the finish to the Bexloy® M492 facesheet was excellent and the adhesion of the Bexloy® M492 facesheet to the SMC was excellent. The plaque was tested against the automotive specification and in general met these specifications and showed the above process can produce automotive grade finished SMC parts for trim and under hood use.

EXAMPLE 3

The product of Example 2 was made according to the process of Example 2 except the 100 ton SMC press was equipped with a vacuum seal as disclosed in U.S. Pat. No. 4,612,149 and evacuated before compressing the green SMC and an additional second piece of uncoated Bexloy® M 492 measuring 10"×18" was placed in a mold in contact with the green SMC on the opposite side of the thermoformed plaque.

The plaque that was produced had the low gloss black finish on the top surface and a layer of Bexloy® M 492 on the bottom. The bottom layer can be used as a protective layer or as a substrate for further processing such as by painting.

EXAMPLE 4

The following series of polyarylate resins sheets having a glass transition temperature of about 175–185° C. were thermoformed and were laminated to an SMC substrate compounded in an extruder with the following compositions:

| Polyarylate Sheet | % Polyarylate | I/T Ratio | Modifier Resins | Rubber Tougheners |
|---|---|---|---|---|
| A | 87.5 | 97/3 | 5% SAN | 7.5 EBAGMA |
| B | 83.0 | 97/3 | 5% SAN | 12% EBAGMA |
| C | 92.5 | 97/3 | — | 7.5 EBAGMA |
| D | 80.8 | 75/25 | 5% SAN | 11.7 EBAGMA |
| E | 83.3 | 75/25 | 7.4% SAN | 9.3 TRX101 |
| F | 100.0 | 97/3 | — | — |
| G | 100.0 | 50/50 | — | — |

Polyarylate - polymerization product of 2,2-bis-(4-hydroxyphenyl)propane and mixture of isophthalic acid and terephthalic acid.
I/T - ratio of isophthalic acid and terephthalic acid used in the polyarylate
SAN - styrene/acrylonitrile polymer
EBAGMA - ethylene/butyl acrylate/glycidyl methacrylate terpolymer
TRX101 - functionalized polyethylene made by Du Pont These sheets of polyarylate are used at several thickness between 250–625 mils. Each sheet was thermoformed at about 190–220° C. and inserted in the 25.4 cm×45.7 cm mold with the vacuum seal used in Example 3. The mold was heated to 160° C. and plaques of varying thickness were formed by molding for 3 minutes. The resulting plaques were between about 1250–5000 microns in thickness and were made with Budd Co. DSM 944, DSM 930 and DSM 950. All of the facesheets had excellent adhesion to the SMC and all formed smooth class A surfaces. DSM944 contains 35% fiberglass and the same polyester resin and calcium carbonate pigment as the aforementioned SCM sheets.

EXAMPLE 5

500 micron thick sheet of Belxoy® M 201 of Zytel 101 nylon/Arylon 401 polyester/functionalized polyethylene ratio 55/32/13 and Bexloy® M 202 of Zytel® 158/Arylon 401/functionalized polyethylene ratio 55/32/13 each having a glass transition temperature of about 170° C. were used in the process of Example 4 but had no adhesion to any of the SMC sheets. SAN, ABS, and polycarbonates resins each having a glass transition temperature of less than 100° C. were likewise tested and failed because of their low Tg which caused these materials to stick to the mold face and showed imperfections caused by glass fibers on the surface of the sheet.

EXAMPLE 6

The 500 micron sheets of Bexloy® M201, and Bexloy® M202 used in Example 5 coated with 10 microns (dry weight) of the water borne size used in Example 1 on one side and baked 15 minutes at 100° C. to remove the solvent. The sheets were trimmed and inserted into the 25.4–45.7 cm. plaque mold with 600 grams of green SMC (Budd Co. DSM 950 described in Example 1) with the size layer in contact with the green SMC. The mold was closed compressing the charge and the facesheets at 8 MPa for 3 minutes at a temperature of 155° C.

The resulting plaques were 0.32 cm. thick and the smooth Bexloy ® facesheets formed a protective layer over the SMC plaque and had a smooth glassy surface free of imperfection. The adhesion of the sized Bexloy ® facesheets was excellent.

EXAMPLE 7

A paint/size coated casting film was prepared as in Example 2 except that a white PVF color coat with the following composition was used instead of the black.

| Ingredient | Parts |
|---|---|
| White millbase | 13 |
| PVF clear dispersion (described in Example 2) | 67 |
| methyl pyrrolidone | 10 |
| propylene carbonate | 10 |

The white color coat has a P/B of 406/100 and a binder composition of 98.8/1.2 PVF/AB acrylic dispersant.

The resulting paint/size coated casting film was transferred to a laminating operation where the paint was transferred from the casting film to a 325 micron sheet of Bexloy ® M201 described in Example 5. The casting film was stripped away from the surface of the laminate, leaving the white paint coat on the exterior of the nylon backing sheet.

30 microns (dry film build) of the water borne polyurethane size was applied to the Bexloy ® side of the laminate and baked for 30 minutes at 100° C. The resulting sized paint-coated laminate was returned to the laminating operation where the laminate was laminated to a thin film of Borg Warner Cycolac ® L ABS resin.

The resulting facesheet was trimmed and inserted into the 25.4×45.7 cm. plaque mold with the PVF coating in contact with the mold face and 600 grams of Budd Co. DSM 950 SMC described in Example 1 was placed in the mold in contact with the facesheet. The mold was closed for 3 minutes at 155° C. under a pressure of 10 MPa.

The resulting composite SMC plaque was glossy and smooth. When tested against automotive specifications, the composite showed the usefullness of this process for producing automotive grade SMC parts.

EXAMPLE 8

250 micron and 625 micron thick sheets of Polyarylate D of Example 4 were thermoformed by heating the facesheet to a temperature of about 210° C. After the sheet was heated to this temperature, it was moved over a vacuum-former and a vacuum drawn to form the sheet into a 25.4×45.7 cm. test plaque form.

The trimmed thermoform was then inserted into a 25.0×45.7 cm. plaque mold with 600 grams of Budd Co. DSM 950 SMC (described in Example 1) and the mold closed for 3 minutes at 150° under a pressure of 7 MPa.

The resultant composite structures each have a smooth thermoplastic surface that is easily cleanable.

We claim:

1. A composite sheet structure consisting essentially of the following layers of components:
   a. a flexible sheet of a thermoplastic polymer comprising a polyarylate polymer having a primary glass transition temperature of greater than 145° C. that is bonded to
   b. a rigid thick thermoset layer of a sheet molding compound (SMC) comprising a polyester resin polymerized with monomers, and containing a filler pigment and glass fibers.

2. The composite sheet structure of claim 1 in which the thermosplastic polymeric sheet is about 125–1000 microns thick, the SMC is about 1500–7500 microns in thickness.

3. The composite sheet structure of claim 2 in which the termoplastic polyester consists essentially of about
   (1) 85 to 98% by weight of a polyarylate consisting essentially of the polymerization product of 2,2-bis(4-hydroxyphenol) propane terephthalic acid and isophthalic acid,
   (b) 2–15% by weight of an olefin polymer containing exposide functionality consisting essentially of the polymerization product of about
      (1) 0.5–15% by weight, based on the weight of the olefin polymer of glycidyl methacrylate,
      (2) 45–99% by weight, based on the weight of the olefin polymer of ethylene and
      (3) 0.1–40% by weight, based on the weight of the olefin polymer, of butyl acrylate and 4. The composite sheet structure of claim 2 in which the thermoplastic polyester consists essentially of about
   (a) 84 to 98.7% by weight of a polyarylate consisting essentially of the polymerization product of 2,2-bis(4-hydroxyphenol) propane terephthalic acid and isophthalic acid,
   (b) 1–22% by weight of an olefin polymer containing epoxide functionality consisting essentially of the polymerization product of about
      (1) 0.5–15% by weight, based on the weight of the olefin polymer of glycidyl methacrylate,
      (2) 44–99% by weight, based on the weight of the olefin polymer of ethylene and
      (3) 0.1–40% by weight, based on the weight of the olefin polymer, of butyl acrylate and
   (c) 0.3–15% by weight of a copolymer consisting essentially of styrene and acrylonitrile.

5. The composite sheet structure of claim 2 in which a second flexible sheet of said thermoplastic polymer is bonded to the rigid thick SMC layer on the opposite side of the original flexible sheet thereby forming a structure having the SMC layer bonded between two flexible sheets.

6. The composite structure of claim 2 in which the thermoplastic polyester sheet has a layer of a thermoplastic pigment containing pain firmly bonded thereto on the side not in contact with the SMC sheet.

7. The composite sheet structure of claim 2 in which the polyarylate comprises at least one dihydric phenol and at least one dicarboxylic acid.

8. The composite sheet structure of claim 7 in which the polyarylate comprises the polymerization product of 2,2-bis(4-hydroxyphenyl) propane and an aromatic dicarboxylic acid selected from the group consisting of isophthalic acid, terephthalic acid or mixtures thereof.

9. The composite sheet structure of claim 8 in which the polyarlate contains and olefin polymer having epoxide functionality comprises the polymerization product of the following monomers:

(a) about 0.5-15% by weight, based on the weight of the olefin polymer, of where R is H or alkyl group having 1-6 carbon atoms, (b) about 45-99% by weight, based on the weight of the olefin polymer, of $CH_2=CHR$ where R is H or lower alkyl group, and (c) about 0.1-40% by weight, based on the weight of the olefin polymer, of $CH_2=C(R^1)COOR^2$ where $R^1$ is H or lower alkyl and $R^2$ is an alkyl group having 1-8 carbon atoms.

10. The composite sheet structure of claim 9 in which the monomers consist of
    (a) glycidyl methacrylate,
    (b) ethylene and
    (c) butyl acrylate.

11. THe composite sheet structure of claim 10 in which the polyarylate contains to 15% by weight of a copolymer of at least one of styrene and alph-methyl styrene and at least one of acrylonitrile and methacrylonitrile.

12. The composite sheet structure of claim 11 in which the copolymer consists essentially of styrene and acrylonitrile.

13. The composite sheet structure of claim 2 in which the rigid thick thermoset layer comprises polyester resin polymerized with monomers, filler pigment and glass fibers.

14. The composite sheet structure of claim 13 in which the polyester resin consists essentially of an acid terminated polyester of an alkylene glycol and an aliphatic and aromatic dianhydride or acid and the polymerized monomers comprise stryene or alph-methyl styrene.

15. The composite sheet structure of claim 14 in which the polyester resin consists essentially of propylene glycol, isophthalic acid and maleic anhydride and the monomer is styrene and the polyester is reacted with magnesium oxide, magnesium hydroxide or magnesium carbonate and the filler pigment is calcium carbonate.

16. The composite sheet structure of claim 15 in which the thermoset layer containing up to 15% by weight of a lower profile additive comprising a high molecular weight thermoplastic resin.

17. The composite structure of claim 2 in which the thermoplastic polyester sheet has a layer of a thermoplastic pigment containing paint firmly bonded thereto on the side not in contact with the SMC sheet and a layer of a glossy clear thermoplastic finish bonded to the paint.

18. The composite of claim 17 wherein the pigmented and clear layers form the exterior surface of the composite and have a gloss of at least 80 measured at 20° and a distinctness of image of at least 80.

19. The composite structure claim 18 in which the the pain and the clear thermoplastic finish have a binder selected from the group consisting of polyvinyl fluoride, polyvinylidene fluoride or a blend of polyvinylidene fluoride and polymethyl methacrylate or polyethyl methacrylate.

20. The composite structure of claim 17 useful as an exterior auto or truck body part comprising the following layers of components:
    a. 10-125 micron thick layer of a glossy clear thermoplastic finish bonded firmly to
    b. 5-75 micron thick layer of a thermoplastic pigment containing paint firmly bonded to
    c. 1-25 micron thick thermoplastic size layer that is firmly bonded to
    d. 250-1250 micron thick layer of a flexible sheet of a thermoplastic polyester that is bonded to
    e. 500-25,000 micron thick rigid thermoset layer of a polyester resin polymerized with monomers, and containing filler pigment and glass fibers.

21. A thermoformable sheet structure comprising layers a. through d. of claim 20.

* * * * *